US011662742B2

(12) United States Patent
Hasegawa et al.

(10) Patent No.: US 11,662,742 B2
(45) Date of Patent: May 30, 2023

(54) SELF-POSITION ESTIMATION METHOD

(71) Applicant: Honda Motor Co., Ltd., Tokyo (JP)

(72) Inventors: Yuji Hasegawa, Saitama (JP); Sango Matsuzaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 459 days.

(21) Appl. No.: 16/820,725

(22) Filed: Mar. 17, 2020

(65) Prior Publication Data

US 2020/0310435 A1    Oct. 1, 2020

(30) Foreign Application Priority Data

Mar. 25, 2019 (JP) .............................. JP2019-057026

(51) Int. Cl.
  *G05D 1/02* (2020.01)
(52) U.S. Cl.
  CPC ........... *G05D 1/027* (2013.01); *G05D 1/0225* (2013.01); *G05D 1/0272* (2013.01)
(58) Field of Classification Search
  CPC .... G05D 1/027; G05D 1/0225; G05D 1/0272; G05D 1/0257; B60T 2201/022; B60T 7/22; G01S 2013/9318; G01S 17/93
  See application file for complete search history.

(56) References Cited

U.S. PATENT DOCUMENTS

2015/0213617 A1* 7/2015 Kim ..................... G06V 20/588
                                                            382/103
2018/0297207 A1* 10/2018 Huang ..................... G06T 7/73

FOREIGN PATENT DOCUMENTS

| DE | 19859169 | A1 * | 6/1999 | .............. E02F 3/435 |
|----|----------|------|--------|---------------------------|
| JP | 2007149088 |    | 6/2007 | |
| JP | 2011128020 | A * | 6/2011 | |
| JP | 2014115247 |    | 6/2014 | |
| JP | 2014211862 |    | 11/2014 | |

OTHER PUBLICATIONS

DE 19859169A1—translation (Year: 1998).*
JP2011128020A (Year: 2011).*
"Office Action of Japan Counterpart Application" with English translation thereof, dated Oct. 25, 2022, p. 1-p. 8.

* cited by examiner

*Primary Examiner* — Abby Y Lin
*Assistant Examiner* — Renee LaRose
(74) *Attorney, Agent, or Firm* — JCIPRNET (57) ABSTRACT

A method capable of appropriately estimating (specifying) a self-position of a mobile object while appropriately correcting an estimated value of a self-position by an SLAM algorithm is provided. In a self-position estimation method, an actual self-position of a mobile object 1 is specified (fixed) from self-positions estimated by a plurality of algorithms. The plurality of algorithms includes an SLAM algorithm (12) and an algorithm (11) different from the SLAM algorithm. A correction processing unit 16 intermittently corrects an estimated value of a self-position obtained by the SLAM algorithm in accordance with any one self-position out of an estimated value of a self-position obtained by an algorithm other than SLAM and a specified self-position.

7 Claims, 3 Drawing Sheets

SELF-POSITION ESTIMATION METHOD

CROSS REFERENCE TO RELATED APPLICATIONS

This application claims the priority benefit of Japanese Patent Application No. 2019-057026, filed on Mar. 25, 2019. The entirety of the above-mentioned patent application is hereby incorporated by reference herein and made a part of this specification.

BACKGROUND

Technical Field

The present disclosure relates to a method of estimating a self-position of a mobile object.

Description of Related Art

Hitherto, various techniques for estimating a self-position of a mobile object such as a mobile robot using detected information of a plurality of sensors have been proposed. For example, in Patent Document 1 (Japanese Patent Application Laid-Open No. 2007-149088), a technique for estimating a self-position of a mobile object using detected information of an internal sensor such as an encoder or a gyroscope and detected information of an external sensor such as a distance measurement sensor, an IR sensor, an ultrasonic sensor, or a camera has been proposed.

In addition, various algorithms including an algorithm for estimating a self-position of a mobile object using detected information of one or more sensors have been hitherto proposed.

Incidentally, in a case where self-positions are estimated using a plurality of algorithms from detected information of a plurality of sensors and a self-position of a mobile object is specified from an estimated value of the plurality of self-positions, a simultaneous localization and mapping (SLAM) algorithm may be adopted as one algorithm among the plurality of algorithms.

However, the SLAM algorithm is configured to estimate a moved position of a mobile object with respect to an initial position by sequentially calculating movement amounts (position variations) of the mobile object in a local coordinate system based on the initial position of the mobile object and multiplying the movement amounts. For this reason, in a case where a self-position of a mobile object in a global coordinate system which is arbitrarily set with respect to a movement environment of the mobile object is estimated, an error of the self-position of the mobile object obtained by an SLAM algorithm may increase in an integration manner due to an error of a set value of the initial position of the mobile object seen in the global coordinate system or errors of sequentially calculated movement amounts. Further, when a self-position of a mobile object is specified by reflecting the self-position of the mobile object which is obtained by a SLAM algorithm, there is a concern that reliability of the specified self-position may be impaired.

The disclosure provides a method by which a self-position of a mobile object can be appropriately estimated (specified) while an estimated value of a self-position is appropriately corrected using a SLAM algorithm in a method of estimating a self-position of a mobile object using a plurality of algorithms including a SLAM algorithm.

SUMMARY

According to one embodiment of the disclosure, there is provided a self-position estimation method of estimating a self-position of a mobile object by each of a plurality of algorithms using detected information of one or more sensors among a plurality of sensors from detected information of the plurality of sensors and specifying a self-position of the mobile object from estimated values of the self-positions obtained by the plurality of algorithms. The plurality of algorithms comprises an first algorithm which is a simultaneous localization and mapping (SLAM) algorithm and a second algorithm which is an algorithm different from the SLAM, and the self-position estimation method comprises a correction step of intermittently correcting an first self-position estimated value which is an estimated value of the self-position obtained by the first algorithm in accordance with any one self-position out of a second self-position estimated value which is an estimated value of the self-position obtained by the second algorithm and a self-position specification value which is the specified self-position.

DESCRIPTION OF THE EMBODIMENTS

Figure 1:
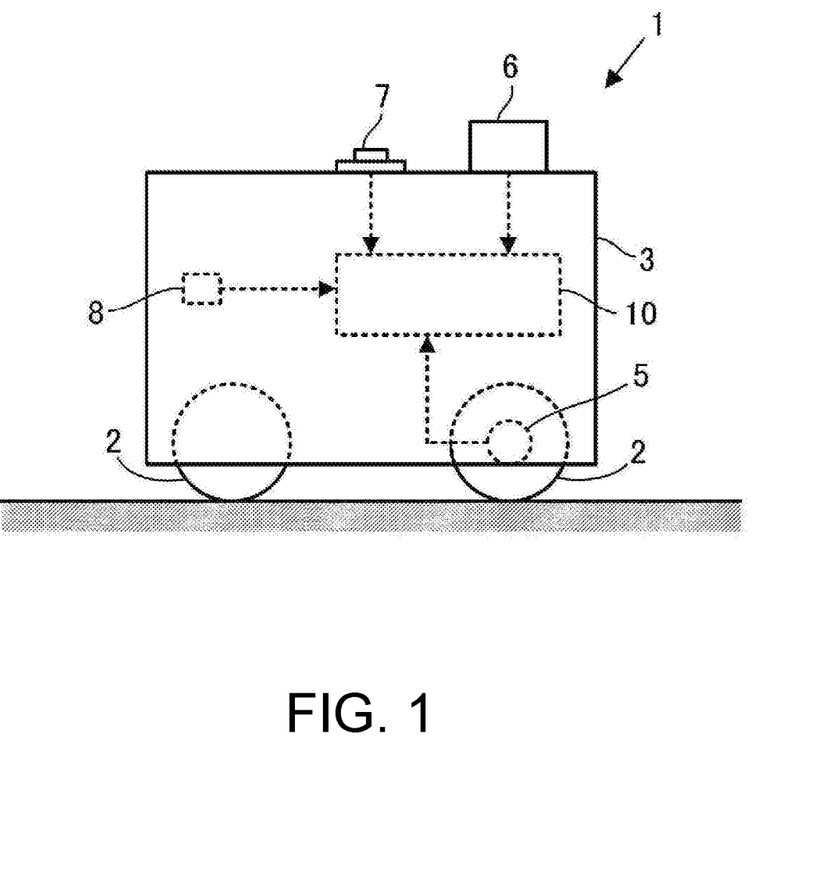
FIG. 1 is a diagram showing a schematic configuration of a mobile object in an embodiment of the disclosure.

An embodiment of the disclosure will be described below with reference to FIG. 1 to FIGS. 3A to 3C. Referring to FIG. 1, a mobile object 1 in the present embodiment, which is, for example, a wheel type mobile object, comprises a body 3 which is supported on a floor surface of a movement environment through a plurality of wheels 2. In addition, the mobile object 1 moves on the floor surface by rotationally driving one or more wheels 2 using an actuator such as an electric motor not shown in the drawing or performing rotation driving and steering (direction conversion) of the one or more wheels 2.

A plurality of sensors used to estimate a self-position are mounted in the mobile object 1. For example, an odometry sensor 5 such as an angular sensor which detects rotation angles of one or more wheels 2, a laser range finder 6 (hereinafter referred to as an LRF 6) as a distance measurement sensor which measures a distance to an external object near the mobile object 1, and a camera 7 which captures an image of a ceiling above the mobile object 1 are mounted in the mobile object 1. Meanwhile, the odometry sensor 5 may include a sensor that detects a steering angle of a steering wheel among the wheels 2 in addition to an angular sensor that detects a rotation angle of the wheel 2. In addition, the camera 7 may be a stereo camera in the present embodiment for example.

A self-position estimation processing apparatus 10 that estimates a self-position using detected information of these sensors is mounted in the mobile object 1. The self-position estimation processing apparatus 10 is constituted by one or more electronic circuit units including, for example, a microcomputer, a memory, an interface circuit, and the like.

Figure 2:
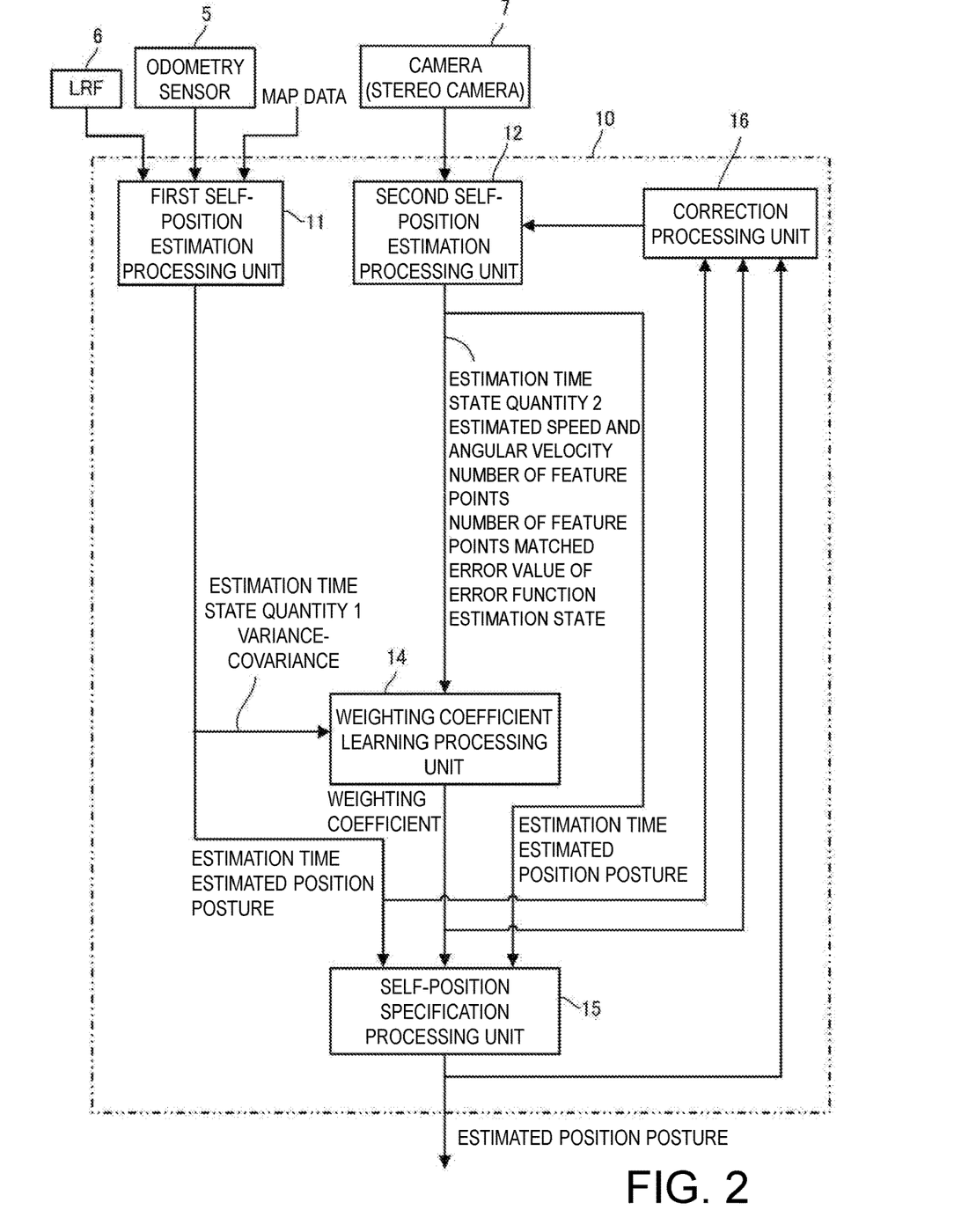
FIG. 2 is a block diagram showing processing performed by a self-position estimation processing apparatus shown in FIG. 1.

In addition, the self-position estimation processing apparatus 10 comprises a first self-position estimation processing unit 11, a second self-position estimation processing unit 12, a weighting factor learning processing unit 14, a self-position specification processing unit 15, and a correction processing unit 16 as shown in a block diagram of FIG. 2 as functions realized by either one or both of a hardware configuration and a program (software configuration) mounted therein. Meanwhile, the self-position estimation processing apparatus 10 is not limited to the above-described functions, and may also include, for example, a function of performing movement control of the mobile object 1, and the like.

The first self-position estimation processing unit 11 is a functional unit that executes a process of estimating a self-position of the mobile object 1 using detected information of the LRF 6 and detected information of the odometry sensor 5, and the second self-position estimation processing unit 12 is a functional unit that sequentially executes processes of estimating a self-position of the mobile object 1 using detected information of the camera 7.

Meanwhile, in the present embodiment, in more detail, a self-position of the mobile object 1 which is estimated by each of the first and second self-position estimation processing units 11 and 12 is a set of the position and posture (orientation) of the mobile object 1 seen in a global coordinate system which is arbitrarily set in a movement environment of the mobile object 1. The self-position of the mobile object 1 which is estimated by the first self-position estimation processing unit 11 is equivalent to a second self-position estimated value in the disclosure, and the self-position of the mobile object 1 which is estimated by the second self-position estimation processing unit 12 is equivalent to a first self-position estimated value in the disclosure. In the following description, the self-position estimated by each of the first and second self-position estimation processing units 11 and 12 may be referred to as estimated position posture.

In addition, the weighting factor learning processing unit 14 is a functional unit that outputs a weighting factor corresponding to each of the first and second self-position estimation processing units 11 and 12 (in detail, a weighting factor for an estimated position posture of the mobile object 1 which is output from each of the first and the second self-position estimation processing units 11 and 12) in accordance with state quantities A and B to be described later which are input from the first and second self-position estimation processing units 11 and 12, and the self-position specification processing unit 15 is a functional unit that specifies a self-position of the mobile object 1 (determines an estimated position posture of the mobile object 1) by combining estimated position postures of the mobile object 1 which are output from each of the first and second self-position estimation processing units 11 and 12 with each other in accordance with a weighting factor which is output from the weighting factor learning processing unit 14. The self-position of the mobile object 1 which is specified by the self-position specification processing unit 15 is equivalent to a self-position specification value in the disclosure.

In addition, the correction processing unit 16 is a functional unit that appropriately generates correction parameters for correcting a self-position (estimated position posture) estimated by the second self-position estimation processing unit 12 and inputs the generated correction parameters to the second self-position estimation processing unit 12.

Hereinafter, the overall processing of the self-position estimation processing apparatus 10 will be described together with details of the above-described functional units.

Processes of the first and second self-position estimation processing units 11 and 12 are executed as described below. Detected information of each of the LRF 6 and the odometry sensor 5 is input to the first self-position estimation processing unit 11, and map data (for example, a two-dimensional occupied grid map or the like) of a movement environment of the mobile object 1 is input thereto. In this case, the map data is stored and held in advance in the memory of the self-position estimation processing apparatus 10 or is downloaded at any time from an external server or the like.

In addition, the first self-position estimation processing unit 11 sequentially estimates self-positions of the mobile object 1 (sequentially determines estimated position postures) using a predetermined algorithm for self-position estimation from detected information (distance measurement data of an external object in the vicinity of the mobile object 1) of the LRF 6, detected information of the odometry sensor 5, and map data.

In the present embodiment, the first self-position estimation processing unit 11 uses an algorithm for estimating a self-position using a particulate filter, for example, an algorithm of a known method such as adaptive Monte Carlo localization (AMCL) as an algorithm for self-position estimation. The algorithm is equivalent to a second algorithm in the disclosure.

In the AMCL algorithm, self-positions of the mobile object 1 (self-positions seen in a global coordinate system) are sequentially estimated through the following process. That is, first, a plurality of particles in a particulate filter are generated near the mobile object 1 in accordance with the initial position and the initial posture (orientation) of the mobile object 1. Meanwhile, the initial position and the initial posture of the mobile object 1 are specified using detection data of the LRF 6 (distance measurement data of an external object in the vicinity of the mobile object 1) and a map, for example, at the start of the movement of the mobile object 1 or immediately before that.

In addition, a new moved position of each particle is estimated in accordance with a moving speed (a translational speed and an angular velocity) of the mobile object 1 which is estimated from detected information of the odometry sensor 5. Subsequently, distance measurement data of an external object in the vicinity of the mobile object 1 is acquired using the LRF 6, and the likelihood of a new moved position of each particle is calculated on the basis of the distance measurement data and map data. In addition, particles having a low likelihood are eliminated through a resampling process, and new particles are generated near particles having a high likelihood.

In the AMCL algorithm, self-positions of the mobile object 1 are sequentially estimated (estimated position postures of the mobile object 1 are sequentially estimated) on the basis of a time series of the position of particles having a high likelihood which are obtained by sequentially executing the above-described processing. However, in the present embodiment, a posture among the self-positions (estimated position postures) of the mobile object 1 which are estimated using the AMCL algorithm is a posture of the mobile object 1 in a yaw direction (a direction around an axis in a vertical direction), and a posture in a roll direction (a direction around an axis in a front-back direction of the mobile object 1) and a posture in a pitch direction (a direction around an axis in a right-left direction of the mobile object 1) are not included.

Further, in the AMCL algorithm, a covariance (in detail, a variance-covariance) as a state quantity related to the certainty of estimated position posture is generated in a process of executing a self-position estimation process of the mobile object 1. In addition, the first self-position estimation processing unit 11 sequentially outputs the self-position (estimated position posture) of the mobile object 1 which is estimated by the AMCL algorithm as described above and an estimation time which is the time of the estimation, and outputs the covariance (variance-covariance) as a state quantity related to the certainty of the estimated position posture (hereinafter referred to as a state quantity 1).

As a supplement, in a case where an abnormality such as the estimated position posture of the mobile object 1, which is determined using an AMCL algorithm, deviating from a predetermined range and a variation in the estimated position posture (a variation for each estimation process cycle) deviating from a predetermined range occurs, the first self-position estimation processing unit 11 corrects the estimated position posture by the self-position specification processing unit 15 in accordance with the self-position of the mobile object 1 which is specified as will be described later. For example, the estimated position posture of the mobile object 1 is corrected to match or come close to a self-position which is specified immediately before by the self-position specification processing unit 15.

A captured image (a captured image of the ceiling above the mobile object 1) is input to the second self-position estimation processing unit 12 as detected information of the camera 7. Meanwhile, in the present embodiment, since the camera 7 is a stereo camera, the detected information (captured image) of the camera 7 which is input to the second self-position estimation processing unit 12 is a stereo image (a pair of captured images). However, the camera 7 is not limited to a stereo camera and may be a monocular camera.

In addition, the second self-position estimation processing unit 12 sequentially estimates self-positions of the mobile object 1 (sequentially determines estimated position postures) using a predetermined algorithm for self-position estimation from the input captured image.

In the present embodiment, the second self-position estimation processing unit 12 uses an algorithm for performing detection of a feature point from an input captured image and matching between the feature point and a feature point detected from a captured image which was input in the past, as an algorithm for self-position estimation. More specifically, the second self-position estimation processing unit 12 uses an algorithm of a known method such as ORB_SLAM as a method of Visual_SLAM as the algorithm. The algorithm is equivalent to a first algorithm in the disclosure.

In the ORB_SLAM algorithm, self-positions of the mobile object 1 are sequentially estimated through the following process. That is, after initial position postures of the mobile object 1 (a set of an initial position and an initial posture of the mobile object 1 seen in a global coordinate system) are set, captured images (stereo images) obtained by the camera 7 are sequentially input to the second self-position estimation processing unit 12, and a process of detecting an ORB feature point from the captured image for each input captured image is sequentially performed. Meanwhile, regarding the initial position posture of the mobile object 1 in the process of the second self-position estimation processing unit 12, an estimated position posture of the mobile object 1 which is obtained by the first self-position estimation processing unit 11 at the start of the movement or immediately before the start of the movement is set, for example, when the mobile object 1 starts to move. However, the initial position posture is appropriately reset through a process of the correction processing unit 16 to be described later.

In addition, an ORB feature point detected from a newly input captured image (a captured image at time t) and an ORB feature point detected from a past captured image (a captured image at time t−Δt) which is input one captured image before are compared with each other, and matching between the ORB feature points is performed. In the matching, it is determined that ORB feature points in which a magnitude (absolute value) of a difference in feature amount is equal to or less than a predetermined threshold value are the same ORB feature points (ORB feature points corresponding to each other). Meanwhile, Δt is a sampling cycle of captured images.

In addition, a movement amount and a moving direction of the mobile object 1 in a period between time t and time t−Δt are estimated on the basis of the matching, and an estimated position posture of the mobile object 1 at time t is determined from estimated values of the movement amount and the moving direction and an estimated position posture of the mobile object 1 at the time t−Δt.

In more detail, the movement amount and the moving direction of the mobile object 1 in a period between two time t and time t−Δt are estimated as a movement amount and a moving direction seen in a local coordinate system for a self-position estimation process (a local coordinate system with an initial position as a starting point) using an ORB_SLAM algorithm. In addition, an estimated position posture (an estimated position posture in a global coordinate system) of the mobile object 1 at time t is obtained by performing coordinate transformation of estimated values of the movement amount and the moving direction of the mobile object 1 in a period between time t and time t−Δt to a movement amount and a moving direction seen in a global coordinate system and adding the movement amount and the moving direction having been subjected to the coordinate transformation to estimated position postures (estimated position postures in a global coordinate system) of the mobile object 1 at time t−Δt. In this case, the coordinate transformation is determined in accordance with a relative position and posture relationship between the local coordinate system and the global coordinate system which is specified on the basis of the initial position posture of the mobile object 1 seen in a global coordinate system.

In the ORB_SLAM algorithm, basically, self-positions of the mobile object 1 are sequentially estimated (estimated position postures of the mobile object 1 are sequentially determined) by sequentially executing the above-described process. In this case, postures among the estimated position postures obtained by the ORB_SLAM algorithm include not only a posture in a yaw direction but also postures in a roll direction and a pitch direction.

Meanwhile, in the present embodiment, in a case where correction parameters determined by the correction processing unit 16 as will be described below are imparted from the correction processing unit 16, the second self-position estimation processing unit 12 corrects a self-position (estimated position posture) estimated as described above in accordance with the correction parameters. This correction process will be described later.

Further, in the ORB_SLAM algorithm, an estimated speed and an angular velocity (estimated values of a translational speed and an angular velocity) of the mobile object 1, the number of detected ORB feature points (a total number) and the number of matched ORB feature points (the number of ORB feature points for which it is determined that the ORB feature points are the same through the matching), an error value of an error function (a difference between feature amounts in the matching), and an estimation state (the degree of estimation accuracy of an estimated speed and angular velocity of the mobile object 1) are generated as state quantities related to certainty of an estimated position posture in a process of executing a self-position estimation process of the mobile object 1.

In addition, the second self-position estimation processing unit 12 sequentially outputs an estimated self-position (estimated position posture) of the mobile object 1 and an estimation time which is the time of the estimation, and outputs an estimated speed and angular velocity (estimated values of a translational speed and an angular velocity) of the mobile object 1, the number of detected ORB feature points and the number of matched ORB feature points, an error value of an error function (a difference between feature amounts in the matching), and an estimation state (the degree of estimation accuracy of an estimated speed and angular velocity of the mobile object 1) as state quantities related to certainty of the estimated position posture (hereinafter referred to as a state quantity 2). Meanwhile, a ratio of the number of matched ORB feature points to the number of ORB feature points (a total number) may be output instead of the number of ORB feature points and the number of matched ORB feature points.

The state quantities 1 and 2 respectively output from the first and second self-position estimation processing units 11 and 12 are input to the weighting factor learning processing unit 14. In the present embodiment, the weighting factor learning processing unit 14 is constituted by a neural network. In addition, regarding the neural network, multimodal learning using a feature vector constituted by the state quantities 1 and 2 as multimodal information is performed in advance.

In more detail, the multimodal learning is learning for generating a weighting factor (weighting factors corresponding to estimated position postures output from the first and second self-position estimation processing units 11 and 12) which are equivalent to the degree indicating to what extent the self-position estimation process of the mobile object 1 using the algorithm of each of the first and second self-position estimation processing units 11 and 12 is appropriately performed as compared to other algorithms from feature vectors constituted by various state quantities 1 and 2.

Such multimodal learning is performed on the neural network of the weighting factor learning processing unit 14 in advance. For this reason, the weighting factor learning processing unit 14 to which the state quantities 1 and 2 are input from the first and second self-position estimation processing units 11 and 12 generates weighting factors corresponding to the first and second self-position estimation processing units 11 and 12 from the feature vectors constituted by the state quantities B1 and A by the neural network and outputs the generated weighting factors.

In this case, the neural network basically generates and outputs weighting factors corresponding to the first and second self-position estimation processing units 11 and 12 so that the values of the weighting factors become larger as certainty of each of the estimated position posture of the mobile object 1 which are output by the first and second self-position estimation processing units 11 and 12 becomes higher.

For example, in a situation where the self-position estimation process for the mobile object 1 which is performed by the first self-position estimation processing unit 11 is performed more appropriately than that of the second self-position estimation processing unit 12, the weighting factors are generated such that the value of the weighting factor corresponding to the first self-position estimation processing unit 11 becomes larger than the value of the weighting factor corresponding to the second self-position estimation processing unit 12.

In addition, for example, in a situation where the self-position estimation process for the mobile object 1 which is performed by the second self-position estimation processing unit 12 is performed more appropriately than that of the first self-position estimation processing unit 11, the weighting factors are generated such that the value of the weighting factor corresponding to the second self-position estimation processing unit 12 becomes larger than the value of the weighting factor corresponding to the first self-position estimation processing unit 11.

The weighting factors corresponding to the first and second self-position estimation processing units 11 and 12 which are output from the weighting factor learning processing unit 14 are input to the self-position specification processing unit 15. In addition, an estimated position posture and an estimation time of the mobile object 1 are input to the self-position specification processing unit 15 from each of the first and second self-position estimation processing units 11 and 12.

In addition, the self-position specification processing unit 15 specifies a position posture obtained by combining estimated position postures of the first and second self-position estimation processing units 11 and 12 at the same time with each other in accordance with the input weighting factors as a self-position of the mobile object 1. That is, the sum of the estimated position postures of the first and second self-position estimation processing units 11 and 12 multiplied by the corresponding weighting factors is specified as a self-position of the mobile object 1. Meanwhile, at this time, the sum of the weighting factors is 1. Further, in the present embodiment, a posture in the self-position of the mobile object 1 which is specified by the self-position specification processing unit 15 is the posture of the mobile object 1 in a yaw direction and does not include postures in a roll direction and a pitch direction.

In the present embodiment, the self-position specification processing unit 15 sequentially specifies self-positions of the mobile object 1 as described above. In addition, the self-position specification processing unit 15 outputs a set of the specified self-position and an estimation time corresponding thereto.

The self-position estimation processing apparatus 10 of the present embodiment executes the process of the correction processing unit 16 while executing the processes of the first and second self-position estimation processing units 11 and 12, the weighting factor learning processing unit 14, and the self-position specification processing unit 15 as described above. Meanwhile, in the following description, a self-position (estimated position posture) estimated by the first self-position estimation processing unit 11 may be referred to as a first estimated position posture, a self-position (estimated position posture) estimated by the second self-position estimation processing unit 12 may be referred to as a second estimated position posture, and a self-position specified by the self-position specification processing unit 15 may be referred to as a specified position posture.

A set of the first estimated position posture and an estimation time which is output from the first self-position estimation processing unit 11, a set of the second estimated position posture and an estimation time which is output from the second self-position estimation processing unit 12, and a set of the specified position posture and an estimation time which is output from the self-position specification processing unit 15 are input to the correction processing unit 16. In addition, the correction processing unit 16 stores and holds data of the input first estimated position posture, second estimated position posture, and specified position posture in a memory not shown in the memory in time series together with estimation times corresponding thereto. In this case, the data stored and held in the memory is data which is input to the correction processing unit 16 in a period from the latest data to before a predetermined period of time.

In addition, first, the correction processing unit 16 determines whether or not an estimation process performed by the second self-position estimation processing unit 12 has been normally performed whenever a second estimated position posture is input. Here, in the present embodiment, since the mobile object 1 moves on a floor surface inside a building having a ceiling, the posture of the mobile object 1 does not change much in a roll direction (a direction around an axis in a front-back direction of the mobile object 1) or a pitch direction (a direction around an axis in a right-left direction of the mobile object 1). Consequently, for example, in a case where a posture in a second estimated position posture newly determined at a time of the latest processing cycle by the second self-position estimation processing unit 12 has changed in a roll direction or a pitch direction more than a predetermined amount from a posture in a second estimated position posture determined at a time one processing cycle before, the correction processing unit 16 determines that a self-position estimation process for the mobile object 1 which is performed by the second self-position estimation processing unit 12 has not been normally performed.

Further, in this case, the correction processing unit 16 instructs the second self-position estimation processing unit 12 to reset a first estimated position posture output from the first self-position estimation processing unit 11 at an estimation time corresponding to the latest second estimated position posture or a time substantially consistent with the estimation time as a new initial position posture of the mobile object 1 in the process of the second self-position estimation processing unit 12, and inputs the first estimated position posture to the first self-position estimation processing unit 12.

In this case, the second self-position estimation processing unit 12 resets the input first estimated position posture as a new initial position posture of the mobile object 1 and resets a local coordinate system in an estimation process performed by the second self-position estimation processing unit 12. In addition, thereafter, the second self-position estimation processing unit 12 executes a self-position estimation process for the mobile object 1 using the reset local coordinate system.

Further, in a case where changes in a posture in the second estimated position posture in a roll direction and a pitch direction remain below a predetermined amount, the correction processing unit 16 determines that a self-position estimation process for the mobile object 1 which is performed by the second self-position estimation processing unit 12 has been normally performed.

In this case, the correction processing unit 16 executes a correction parameter determination process to be described below, for example, whenever a predetermined period elapses (further, intermittently). Meanwhile, the predetermined period is a period, for example, from when the period is started to when the number of times of sampling of a captured image of the camera 7 which is acquired by the second self-position estimation processing unit 12 reaches a predetermined number.

In the correction parameter determination process, the correction processing unit 16 extracts time-series data of a second estimated position posture which is output from the second self-position estimation processing unit 12 and time-series data of a first estimated position posture which is output from the first self-position estimation processing unit 11 from the memory not shown in the drawing within a first predetermined period when the first predetermined period has elapsed after the mobile object 1 starts to move. In addition, time-series data of a first estimated position posture which is output from the first self-position estimation processing unit 11 and time-series data of a specified position posture which is output from the self-position specification processing unit 15 are extracted from the memory not shown in the drawing within each predetermined period when a second predetermined period or each of the subsequent predetermined periods has elapsed. Meanwhile, regarding a timing of a starting point of the second predetermined period or each of the subsequent predetermined periods, when an initial position posture of the mobile object 1 by the second self-position estimation processing unit 12 is reset as described above, a timing of the resetting is a timing of a starting point of a new predetermined period.

Here, the estimation process performed by the second self-position estimation processing unit 12 is a process of sequentially multiplying movement amounts and moving directions of the mobile object 1 which are sequentially obtained from the initial position posture of the mobile object 1. For this reason, errors of second estimated position postures of the mobile object 1 which are sequentially obtained by the second self-position estimation processing unit 12 may increase in an integration manner due to an error of an initial position posture (an initial position posture seen in a global coordinate system) of the mobile object 1, estimation errors of movement amounts and moving directions of the mobile object 1 which are sequentially obtained by the second self-position estimation processing unit 12, or the like.

Figure 3A:
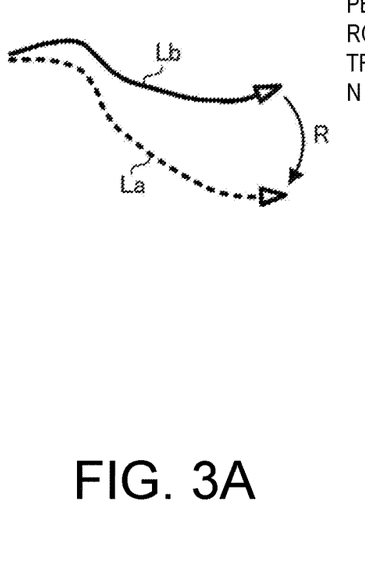
FIGS. 3A to 3C are diagrams showing processing of a correction processing unit shown in FIG. 2.

Further, a moving track of the mobile object 1 indicated by time-series data of a second estimated position posture (hereinafter, referred to as a moving track Lb) may deviate from a moving track of the mobile object 1 indicated by time-series data of a first estimated position posture or time-series data of a specified position posture (hereinafter, referred to as a moving track La) as shown in FIG. 3A. Further, in the present embodiment, since the self-position specification processing unit 15 obtains a specified position posture of the mobile object 1 as described above, there is a possibility that the stability of a specified position posture determined by the self-position specification processing unit 15 is poor immediately after the start of the movement of the mobile object 1.

Figure 3B:
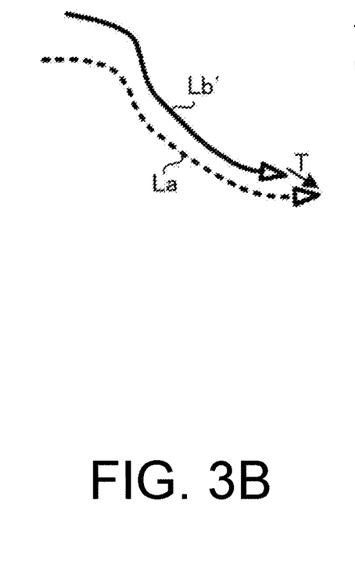

Consequently, the correction processing unit 16 determines a rotation transformation matrix R for performing rotation transformation so that the moving track Lb of the mobile object 1 which is indicated by time-series data of a second estimated position posture is brought close to the moving track La of the mobile object 1 which is indicated by time-series data of a first estimated position posture, using the time-series data of the second estimated position posture which is output from the second self-position estimation processing unit 12 and the time-series data of the first estimated position posture which is output from the first self-position estimation processing unit 11 within a first predetermined period when the first predetermined period elapses immediately after the start of the movement of the mobile object 1. The rotation transformation matrix R is determined using, for example, a point cloud library (PCL) which is a known point cloud processing library. A moving track Lb' shown in FIG. 3B represents a moving track after the rotation transformation of the moving track Lb is performed using the rotation transformation matrix R.

Figure 3C:
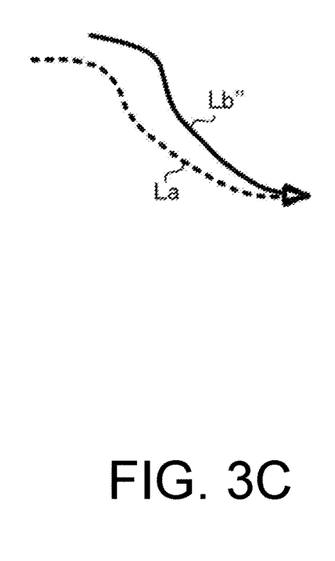

Further, the correction processing unit 16 determines a translation converting operation amount T (for example, a translation movement vector) for performing translation movement so that a terminus of the moving track Lb' formed by performing rotation transformation on the moving track Lb of the mobile object 1 indicated by time-series data of a second estimated position posture using the rotation transformation matrix R is consistent with a terminus of the moving track La of the mobile object 1 indicated by time-series data of a first estimated position posture as shown in FIG. 3C. The translation converting operation amount T is obtained from the position of the terminus of the moving track Lb' after rotation transformation (a position in a global coordinate system) and the position of a terminus of a moving track L2 of the mobile object 1 (a position in a global coordinate system). The moving track Lb' shown in FIG. 3C represents a moving track after translation conversion of the moving track Lb is performed using the translation converting operation amount T.

When each of a second predetermined period and the subsequent predetermined periods elapses, the correction processing unit 16 determines a rotation transformation matrix R and a translation converting operation amount T as described above using time-series data of a specified position posture which is output from the self-position specification processing unit 15 instead of the time-series data of the first estimated position posture.

In the present embodiment, the correction processing unit 16 basically outputs the rotation transformation matrix R and the translation converting operation amount T determined as described above to the second self-position estimation processing unit 12 as correction parameters for correcting a second estimated position posture whenever a predetermined period elapses. However, in the present embodiment, since the posture of an estimated position posture obtained by the first self-position estimation processing unit 11 and the posture of a specified position posture specified by the self-position specification processing unit 15 are postures in a yaw direction, it is preferable that the rotation transformation matrix R rotate the second estimated position posture in a yaw direction or substantially a yaw direction.

Consequently, in the present embodiment, the correction processing unit 16 outputs the rotation transformation matrix R and the translation converting operation amount T to the second self-position estimation processing unit 12 as correction parameters only in a case where a component related to rotation transformation in a yaw direction in the rotation transformation matrix R determined as described above (specifically, a 3×3 component) has a value sufficiently close to "1" (in detail, in a case where an absolute value of a deviation between the component and "1" is smaller than a predetermined threshold value near zero), and instructs the second self-position estimation processing unit 12 to correct the second estimated position posture using the correction parameters.

In this case, the second self-position estimation processing unit 12 corrects the second estimated position posture obtained by an ORB_SLAM algorithm as described above, using the correction parameters input from the correction processing unit 16 (the rotation transformation matrix R and the translation converting operation amount T) in the following estimation process. That is, the second self-position estimation processing unit 12 corrects the second estimated position posture by performing rotation transformation on the second estimated position posture obtained by the ORB_SLAM algorithm using the rotation transformation matrix R and performing translation conversion using the translation converting operation amount T. In addition, the second self-position estimation processing unit 12 outputs the corrected second estimated position posture.

In addition, the correction processing unit 16 does not instruct the second self-position estimation processing unit 12 to correct the second estimated position posture and does not output the rotation transformation matrix R and the translation converting operation amount T in a case where a component related to rotation transformation in a yaw direction in the rotation transformation matrix R is not a value sufficiently close to "1" (in a case where an absolute value of a deviation between the component and "1" is larger than a predetermined threshold value near zero). In this case, the second self-position estimation processing unit 12 outputs the second estimated position posture obtained by the ORB_SLAM algorithm without correction.

In the present embodiment, as described above, the process of the self-position estimation processing apparatus 10 is executed. In this case, a second estimated position posture obtained by the second self-position estimation processing unit 12 that estimates a self-position of the mobile object 1 by an ORB_SLAM algorithm as an example of VISUAL_SLAM is corrected in accordance with correction parameters (a rotation transformation matrix R and a translation converting operation amount T) determined by the correction processing unit 16 using a first estimated position posture output by the first self-position estimation processing unit 11 or a specified position posture output by the self-position specification processing unit 12 whenever a predetermined period elapses (intermittently). Thereby, it is possible to prevent an error of the second estimated position posture from increasing in an integration manner due to an error of an initial position posture of the mobile object 1 in an estimation process performed by the second self-position estimation processing unit 12 or errors of movement amounts and moving directions of the mobile object 1 which are sequentially obtained in the estimation process. Further, maintaining the reliability of the specified position posture output by the self-position specification processing unit 15 can be realized with high robustness.

In addition, the rotation transformation matrix R and the translation converting operation amount T as correction parameters are determined such that a moving track Lb indicated by time-series data of a second estimated position posture output by the second self-position estimation processing unit 12 is brought close to a moving track La indicated by time-series data of a first estimated position posture output by the first self-position estimation processing unit 11 or a specified position posture output by the self-position specification processing unit 15. For this reason, it is possible to determine the rotation transformation matrix R and the translation converting operation amount T which are suitable as correction parameters.

Further, in the embodiment, self-positions respectively estimated by the first and second self-position estimation processing units 11 and 12 (a first estimated position posture and a second estimated position posture) are combined with each other using weighting factors determined by the weighting factor learning processing unit 14 in accordance with state quantities 1 and 2 for each of the first and second self-position estimation processing units 11 and 12, so that a self-position of the mobile object 1 is specified.

Further, in this case, since the weighting factor learning processing unit 14 uses state quantities 1 and 2 for each of the first and second self-position estimation processing units 11 and 12 as input information, weighting factors to be output in accordance with the state quantities 1 and 2 can be learned in advance in various movement environments of the mobile object 1.

For this reason, the self-position estimation processing apparatus 10 can estimate (specify) a self-position of the mobile object 1 with high reliability in various movement environments of the mobile object 1.

Meanwhile, the disclosure is not limited to the above-described embodiment, and other embodiments can be adopted. Hereinafter, several other embodiments will be described.

In the embodiment, the correction processing unit 16 determines correction parameters (a rotation transformation matrix R and a translation converting operation amount T) using time-series data of a specified position posture output from the self-position specification processing unit 15 when a second predetermined period or each of the subsequent predetermined periods elapses. However, even when the second predetermined period or each of the subsequent predetermined periods elapses, correction parameters (a rotation transformation matrix R and a translation converting operation amount T) may be determined using time-series data of a first estimated position posture output from the first self-position estimation processing unit 11.

Alternatively, for example, the degree of reliability or certainty of a first estimated position posture output from the first self-position estimation processing unit 11 may be determined on the basis of a state quantity 1 output from the first self-position estimation processing unit 11 or weighting factors determined by the weighting factor learning processing unit 14, and it may be selected which one out of time-series data of a first estimated position posture and time-series data of a specified position posture is to be used to determine correction parameters in accordance with determination results. More specifically, in a case where it is determined that the reliability or certainty of the first estimated position posture is high, the time-series data of the first estimated position posture may be used to determine correction parameters, and otherwise, the time-series data of the specified position posture may be used to determine correction parameters.

Further, in the embodiment, a posture in the first estimated position posture obtained by the first self-position estimation processing unit 11 and a posture in the specified position posture obtained by the self-position specification processing unit 15 are postures only in a yaw direction, but a posture in a roll direction and a posture in a pitch direction may be included.

In addition, an algorithm for an estimation process of the second self-position estimation processing unit 12 is not limited to ORB_SLAM and may be any of other SLAM algorithms.

Further, in the embodiment, a self-position estimation processing apparatus including two self-position estimation processing units (the first and second self-position estimation processing units 11 and 12) as self-position estimation processing units is described. However, for example, any of other self-position estimation processing unit capable of estimating a self-position of the mobile object 1 using any of other algorithms may be included instead of the first self-position estimation processing unit 11 or in addition to the first and second self-position estimation processing units 11 and 12. As the other self-position estimation processing units, for example, a self-position estimation processing unit that estimates a self-position of the mobile object 1 using a magnetic sensor capable of being mounted in the mobile object 1, the odometry sensor 5, and a map in a magnetic state of a movement environment of the mobile object 1 may be adopted. In this case, as an algorithm of a self-position estimation process, an algorithm similar to that of the first self-position estimation processing unit 11 (AMCL algorithm) may be used.

Meanwhile, in a case where a self-position estimation processing apparatus includes three or more self-position estimation processing units, a self-position of the mobile object 1 may be specified by determining weighting factors corresponding to the self-position estimation processing units by the weighting factor learning processing unit 14 by a method similar to that in the embodiment and combining self-positions estimated by the self-position estimation processing units using the weighting factors with each other.

Further, in the embodiment, a neural network for performing multimodal learning is described as the weighting factor learning processing unit 14. However, a recursive neural network (RNN) such as a long short-term memory (LSTM) may be used as the weighting factor learning processing unit 14.

Further, in the embodiment, an estimated speed and angular velocity (estimated values of a translational speed and an angular velocity) of the mobile object 1, the number of detected ORB feature points, the number of matched ORB feature points, an error value (a difference between feature amounts in the matching) of an error function, and an estimation state are used as the state quantity 2 related to the second self-position estimation processing unit 12. However, some state quantities among these state quantities, for example, the estimated speed and angular velocity of the mobile object 1, the error value of the error function, the estimation state, and the like may be omitted.

In addition, a method of specifying an actual self-position of the mobile object 1 from self-positions estimated by a plurality of self-position estimation processing units is not limited to the method described in the embodiment. For example, a self-position estimated by one self-position estimation processing unit selected from among the plurality of self-position estimation processing units on the basis of an operation state of the mobile object 1 or the state of the surrounding environment may be specified as an actual self-position of the mobile object 1 as it is.

Further, in the embodiment, the LRF 6 is used as a distance measurement sensor. However, for example, an ultrasonic type distance measurement sensor or the like may be used instead of the LRF 6.

Further, in the embodiment, a wheel type mobile object 1 is described as a mobile object. However, a mobile object to be applied to the disclosure is not limited to a wheel type mobile object, and may be, for example, a leg type mobile object, an inverted pendulum type mobile object, or the like.

Other Configurations

According to one embodiment of the disclosure, there is provided a self-position estimation method of estimating a self-position of a mobile object by each of a plurality of algorithms using detected information of one or more sensors among a plurality of sensors from detected information of the plurality of sensors and specifying a self-position of the mobile object from estimated values of the self-positions obtained by the plurality of algorithms. The plurality of algorithms comprises an first algorithm which is a simultaneous localization and mapping (SLAM) algorithm and a second algorithm which is an algorithm different from the SLAM, and the self-position estimation method comprises a correction step of intermittently correcting an first self-position estimated value which is an estimated value of the self-position obtained by the first algorithm n accordance with any one self-position out of a second self-position estimated value which is an estimated value of the self-position obtained by the second algorithm and a self-position specification value which is the specified self-position.

Meanwhile, in the embodiment, unless otherwise specified, the "self-position" of the mobile object is a self-position seen in a global coordinate system which is arbitrarily set in a movement environment of the mobile object. In addition, the "self-position" is not limited to the general meaning of a position of a mobile object (coordinate position), but may include the posture (orientation) of the mobile object.

According to the configuration, since the correction step is included, the first self-position estimated value obtained by the first algorithm which is an SLAM algorithm is intermittently corrected (every time a predetermined period of time elapses) in accordance with the one self-position (the Second self-position estimated value or the self-position specification value). Thereby, it is possible to prevent an error of the first self-position estimated value from increasing in an integration manner. Further, a self-position of the mobile object can be specified using the first self-position estimated value having high reliability (a self-position specification value can be obtained).

Therefore, according to the configuration, it is possible to appropriately estimate (specify) a self-position of a mobile object while appropriately correcting an estimated value of a self-position by a SLAM algorithm.

In the correction step of the configuration, parameters for correcting the first self-position estimated value so that a track indicated by a time series of the first self-position estimated value may approach a track indicated by a time series of the one self-position be determined based on the time series of the one self-position out of the second self-position estimated value and the self-position specification value in a predetermined period and the time series of the first self-position estimated value in the predetermined period, and the first self-position estimated value after the predetermined period be corrected using the determined parameters.

Accordingly, parameters having high reliability can be determined as parameters for correcting the first self-position estimated value. Further, it is possible to suitably correct the First self-position estimated value by correcting the First self-position estimated value after the predetermined period using the determined parameters.

In the above configurations, the plurality of sensors may comprise a camera that captures an image of an outside world of the mobile object. In this case, the First algorithm may be a Visual_SLAM algorithm for sequentially executing a process of detecting a feature point from the captured image of the camera and a process of performing matching between the detected feature point and a feature point detected from a captured image later than the captured image.

Accordingly, since the first algorithm is a Visual_SLAM algorithm, it is possible to suitably estimate a self-position by the first algorithm.

Further, in the above configurations, the plurality of sensors may comprise a distance measurement sensor that measures a distance of the mobile object to an external object. In this case, the second algorithm may be an algorithm for measuring a self-position of the mobile object using distance measurement data obtained by the distance measurement sensor and a particulate filter.

Accordingly, in a situation where there are no other mobile objects in the vicinity of the mobile object, or the like, a second self-position estimated value having high reliability (in other words, high certainty) can be obtained by the second algorithm. Further, a self-position specification value having high reliability can be obtained on the basis of the second self-position estimated value obtained by the second algorithm.

For this reason, it is possible to suitably improve the reliability of correction of the first self-position estimation value in accordance with the one self-position (the second self-position estimated value or the self-position specification value).

In the above configurations, the self-position estimation method may further comprise a step of inputting a state quantity related to certainty of the self-positions measured by each of the algorithms to a learned neural network and determining a weighting factor for each of the plurality of algorithms by the neural network from the input state quantity for each of the plurality of algorithms, the state quantity being one or more state quantities obtained through an estimation process of each algorithm.

A self-position obtained by combining the self-positions estimated by the plurality of algorithms with each other using the determined weighting factors be specified as a self-position specification value of the mobile object.

In a neural network for determining a weighting factor for each of the plurality of algorithms, one or more state quantities obtained through an estimation process of each algorithm (a process of estimating a self-position of a mobile object) are input to the neural network for each algorithm, and a weighting factor for each algorithm is determined from the state quantities.

In this case, since state quantities for each algorithm are state quantities related to certainty of a self-position of a mobile object which is estimated by the algorithms, the state quantities for each algorithm are obtained by reflecting the degree indicating to what extent the algorithm estimation process is appropriately performed in obtaining an estimated value having high reliability of a self-position of a mobile object.

For this reason, the neural network can determine weighting factors for each algorithm in accordance with all state quantities to be input for each algorithm so that weighting factors corresponding to each algorithm become relatively high in a situation where a self-position estimation process using the algorithm can be performed more appropriately than that using other algorithms and become relatively low in a situation where it is more difficult to appropriately perform a self-position estimation process using the algorithm than to perform a self-position estimation process using other algorithms through preliminary learning of the neural network.

In addition, weighting factors for each algorithm which are determined by the neural network are determined depending on the state quantities for each algorithm instead of the accuracy of a self-position of a mobile object which is estimated by the algorithms, and thus the weighting factors are hardly affected by a place in a movement environment of the mobile object.

In addition, according to the configuration, a position obtained by combining the self-positions estimated by the plurality of algorithms with each other using weighting factors determined as described above is specified as a self-position specification value of the mobile object.

Thereby, according to the configuration, it is possible to estimate a self-position of a mobile object in a state where it is difficult to be affected by a movement environment of a mobile object.

As a supplement, in the above configuration, in a case where the first algorithm is an algorithm (Visual_SLAM algorithm), the state quantities according to the first algorithm comprise, for example, a state quantity indicating a ratio of the number of feature points associated by the matching to the total number of feature points detected from the captured image. Thereby, the state quantity is suitable as a state quantity related to certainty of a self-position of the mobile object which is estimated by the first algorithm.

Further, in the configuration, in a case where the second algorithm is an algorithm, the state quantity according to the second algorithm include a covariance generated in a process in which a self-position of the mobile object is estimated by the second algorithm. Thereby, the state quantity is suitable as a state quantity related to certainty of a self-position of a mobile object which is estimated by the second algorithm.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A self-position estimation method, comprising:
   estimating a first self-position of a mobile object by a first algorithm using detected information of a first sensor, wherein a first self-position estimated value is an estimated value of the first self-position obtained by the first algorithm;
   estimating a second self-position of the mobile object by a second algorithm using detected information of second sensor to generate a second self-position estimated value, wherein a second self-position estimated value is an estimated value of the second self-position obtained by the second algorithm;
   specifying a self-position of the mobile object from the first estimated value of the first self-position obtained by the first algorithm and the second estimated value of the second self-position obtained by the second algorithm;
   generating correction parameters for correcting the first self-position estimated value based on the first self-position, the second self-position or a self-position specification value that is the specified self-position, wherein the parameters includes a rotation transformation matrix and a translation converting operation amount; and
   intermittently correcting the first self-position estimated value with the correction parameters,
   wherein the rotation transformation matrix is determined by using time-series data of the first self-position estimated value and time-series data of the second self-position estimated value in a manner that a first moving track of the mobile object indicated by time-series data of the second self-position estimated value is brought close to a second moving track of the mobile object indicated by time-series data of the first self-position estimated value,
   the translation converting operation amount is determined in a manner that an end of the second moving track is consistent with an end of a rotated moving track that is obtained by performing a rotation transformation on the first moving track using the rotation transformation matrix, and
   wherein the plurality of algorithms comprises a first algorithm that is a simultaneous localization and mapping (SLAM) algorithm and a second algorithm that is an algorithm different from the SLAM algorithm.

2. The self-position estimation method according to claim 1, wherein
   the plurality of sensors comprises a camera that captures an image of an outside world of the mobile object, and
   the first algorithm is for sequentially executing a process of detecting a feature point from a captured image of the camera and a process of performing matching between the detected feature point and a feature point detected from a captured image later than the captured image.

3. The self-position estimation method according to claim 1, wherein
   the plurality of sensors comprises a distance measurement sensor that measures a distance of the mobile object to an external object, and
   the second algorithm is an algorithm for estimating the second self-position of the mobile object using distance measurement data obtained by the distance measurement sensor and a particulate filter.

4. The self-position estimation method according to claim 2, wherein
   the plurality of sensors comprises a distance measurement sensor that measures a distance of the mobile object to an external object, and
   the second algorithm is an algorithm for estimating the second self-position of the mobile object using distance measurement data obtained by the distance measurement sensor and a particulate filter.

5. The self-position estimation method according to claim 1, further comprising:
   a step of inputting a state quantity related to certainty of the first and the second self-positions respectively estimated by the first and the second algorithms to a learned neural network and determining a weighting factor for each of the first and the second algorithms by the neural network from the input state quantity for the first and the second algorithms, the state quantity being one or more state quantities obtained through an estimation process of the first and the second algorithms,
   wherein the self-position is obtained by combining the first and the second self-positions respectively estimated by the first and the second algorithms with each other using the determined weighting factors and is specified as the self-position specification value of the mobile object.

6. The self-position estimation method according to claim 2, further comprising:
   a step of inputting a state quantity related to certainty of the first and the second self-positions respectively estimated by the first and the second algorithms to a learned neural network and determining a weighting factor for each of the first and the second algorithms by the neural network from the input state quantity for the first and the second algorithms, the state quantity being one or more state quantities obtained through an estimation process of the first and the second algorithms,
wherein a self-position is obtained by combining the first and the second self-positions respectively estimated by the first and the second algorithms with each other using the determined weighting factors and is specified as the self-position specification value of the mobile object.

7. The self-position estimation method according to claim 3, further comprising:
a step of inputting a state quantity related to certainty of the first and the second self-positions respectively estimated by the first and the second algorithms to a learned neural network and determining a weighting factor for each of the first and the second algorithms by the neural network from the input state quantity for the first and the second algorithms, the state quantity being one or more state quantities obtained through an estimation process of the first and the second algorithms,
wherein the self-position is obtained by combining the first and the second self-positions respectively estimated by the first and the second algorithms with each other using the determined weighting factors and is specified as the self-position specification value of the mobile object.

* * * * *